United States Patent [19]

Clegg

[11] Patent Number: 4,598,807

[45] Date of Patent: Jul. 8, 1986

[54] BAND AND DRUM CLUTCH

[76] Inventor: John E. Clegg, 2320 Keystone Dr., Orlando, Fla. 32806

[21] Appl. No.: 674,392

[22] Filed: Nov. 23, 1984

[51] Int. Cl.⁴ ............................................. F16D 41/20
[52] U.S. Cl. ................................... 192/80; 192/82 P
[58] Field of Search ............... 192/80, 82 P, 51, 79, 192/41 R, 43, 48.92, 93 R, 54, 41 S, 41 A

[56] References Cited

U.S. PATENT DOCUMENTS

| 705,931 | 7/1902 | Joss | 192/41 R |
|---|---|---|---|
| 917,205 | 4/1909 | Warner | 192/80 X |
| 986,923 | 3/1911 | Knapp | 192/80 |
| 2,335,848 | 12/1943 | Dodwell | 192/41 S |
| 2,479,965 | 8/1949 | Ragsdale | 192/41 S |
| 2,888,087 | 5/1959 | Duncan | 192/93 R |
| 4,252,221 | 2/1981 | Lanzerath et al. | 192/41 A |

*Primary Examiner*—George H. Krizmanich

[57] ABSTRACT

A revolving flexible circular steel band mounted on a drum, with a tightening member locking the band to the drum to transmit rotary motion of the band to the drum. The inner wall of the band is divided into three shoes which grip the drum when the band is tightened. The tightening member is an overlapping wedge which is depressed onto an underlapping wedge, with the resulting wedging action decreasing the circumference of the band and locking it to the drum.

1 Claim, 2 Drawing Figures

BAND AND DRUM CLUTCH

BACKGROUND OF THE INVENTION

The invention relates to clutches having a band or strap which is tightened around a drum or shaft.

Prior art includes four inventions which feature wedge-activated gripping members: Rachet Mechanism, U.S. Pat. No. 705,931, 7/29/02, by C. Joss; Clutch, U.S. Pat. No. 2,335,848, 12/7/43, by J. M. Dodwell; Spring Clutch, U.S. Pat. No. 2,479,965, 8/23/49, by L. A. B. Ragsdale; and Freewheel Clutch With A Cage, U.S. Pat. No. 4,252,221, 2/24/81, by Lanzerath et al.

BRIEF SUMMARY OF THE INVENTION

The invention is a simple clutch mechanism in which the rotary motion of an outer cylindrical member (a band) is transferred to an inner cylindrical member (a drum) by locking the outer member to the inner member. An advantage of the clutch is a locking device consisting of an overlapping wedge which is tightened around the drum by exerting pressure on an underlapping wedge. A disadvantage of the clutch is the lack of a gripping device which distributes the locking action of a period of time and prevents instantaneous locking.

DETAILED DESCRIPTION OF THE PREFERRED EMBODIMENT

Figure 1:
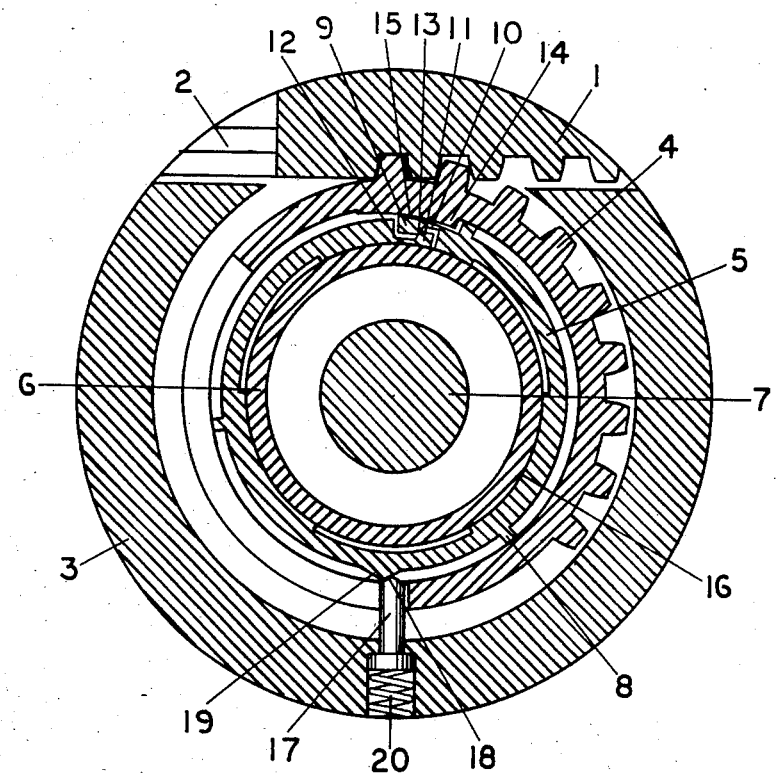
FIG. 1 is a cross section of the clutch taken on line 1—1 of FIG. 2.
Figure 2:
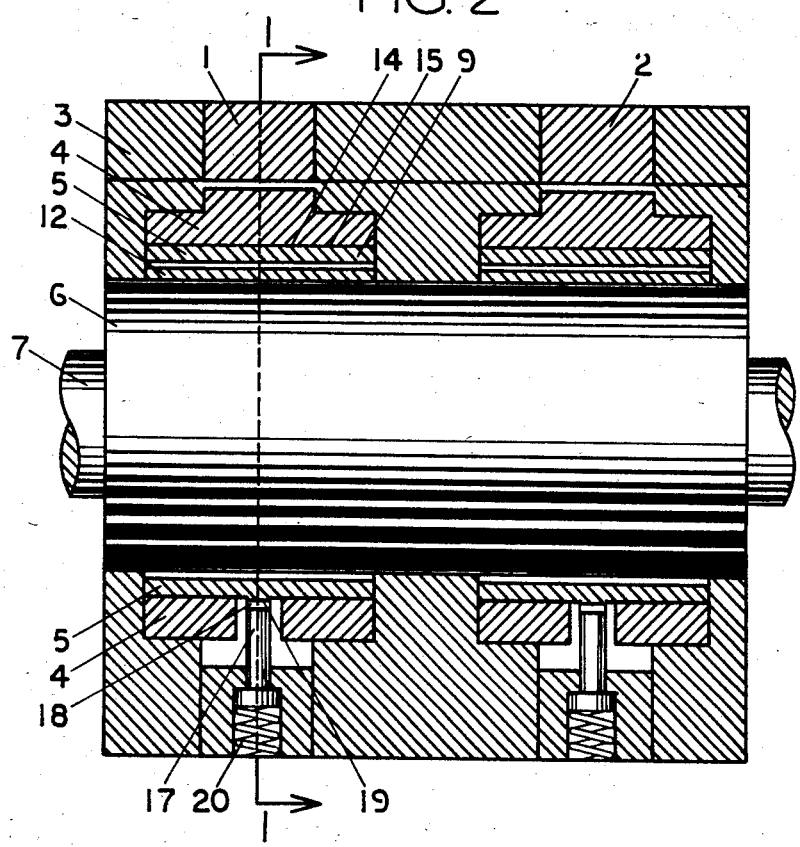
FIG. 2 is a longitudinal section of the clutch.

FIG. 1 shows forward rack 1 and reverse rack 2 which move across the face of interior block 3 in opposite directions. Forward rack 1 and reverse rack 2 are reciprocating members of an automatic variable transmission, and their function is to control forward and reverse movement of the vehicle by revolving the forward and reverse pinions. Forward rack 1 engages forward pinion 4, which is an annular pinion encircling band 5.

Alignment of band 5 inside forward pinion 4 is maintained by longitudinal ridges 8 which are in contact with the internal wall of pinion 4 when band 5 is expanded.

Overlapping wedge 9 is an integral inward projection of overlapping band end 10, and underlapping wedge 11 is an integral outward projection of underlapping band end 12, with the adjacent wedge faces 13 being parallel and in contact on a common non-radial longitudinal plane.

Transverse motion of forward rack 1 revolves forward pinion 4. Inclined tooth 14 on the internal wall of pinion 4 depresses wedge head 15 which forces overlapping wedge 9 inward into the intervening space between overlapping and underlapping band ends 10 and 12. The wedging action occurs on wedge faces 13, and band 5 is contracted in circumference, with band shoes 16 gripping drum 6 which is keyed to output shaft 7.

Band 5 is prevented from revolving prematurely when inclined tooth 14 depressed wedge head 15 by restraining bolt 17 with a double inclined tooth 18 which is held in contact with a similar double inclined tooth 19 on the outside wall of band 5 by compression spring 20.

I claim:

1. A band and drum clutch comprising a drum (6), a circular noncontinuous band (5) encompassing said drum (6), an outer revolving member (4) mounted coaxially around said band (5), said band (5) comprising an underlapping wedge (11) which is an integral outward projection of underlapping band end (12) and comprising an overlapping wedge (9) which is an integral inward projection of overlapping band end (10) with wedge faces (13) therebetween, said overlapping wedge (9) having a wedge head (15) associated therewith, said outer revolving member (4) having an inclined tooth (14) on an internal wall thereof, said inclined tooth (14) cooperating with said wedge head (15) to depress said wedge head (15) thus causing said wedge faces (13) to reduce the circumference of said band (5) and lock said band (5) to said drum (6) whenever said outer revolving member (4) is rotated in one direction.

* * * * *